US008125528B2

(12) United States Patent
Lee

(10) Patent No.: US 8,125,528 B2
(45) Date of Patent: Feb. 28, 2012

(54) APPARATUS FOR DIGITAL IMAGE STABILIZATION, METHOD USING THE SAME AND COMPUTER READABLE MEDIUM STORED THEREON COMPUTER EXECUTABLE INSTRUCTIONS FOR PERFORMING THE METHOD

(75) Inventor: Young-Sin Lee, Seoul (KR)

(73) Assignee: Core Logic Inc., Seoul (KR)

( * ) Notice: Subject to any disclaimer, the term of this patent is extended or adjusted under 35 U.S.C. 154(b) by 961 days.

(21) Appl. No.: 12/152,010

(22) Filed: May 12, 2008

(65) Prior Publication Data

US 2008/0284859 A1  Nov. 20, 2008

(30) Foreign Application Priority Data

May 11, 2007 (KR) ........................ 10-2007-0046024

(51) Int. Cl.
 H04N 5/228  (2006.01)
 G06K 9/40  (2006.01)
 G03B 17/00  (2006.01)
(52) U.S. Cl. ................. 348/208.99; 348/221.1; 382/274; 396/52; 396/55
(58) Field of Classification Search ............. 348/208.99, 348/208.1, 221.1; 382/274; 396/52–55
See application file for complete search history.

(56) References Cited

U.S. PATENT DOCUMENTS

| | | | | |
|---|---|---|---|---|
| 5,420,635 A | * | 5/1995 | Konishi et al. | 348/362 |
| 7,176,962 B2 | * | 2/2007 | Ejima | 348/208.4 |
| 7,602,418 B2 | * | 10/2009 | Border et al. | 348/208.6 |
| 2006/0098237 A1 | * | 5/2006 | Steinberg et al. | 358/302 |
| 2008/0084480 A1 | * | 4/2008 | Jeong et al. | 348/208.99 |
| 2008/0170128 A1 | * | 7/2008 | Oh et al. | 348/208.11 |
| 2008/0259175 A1 | * | 10/2008 | Muramatsu et al. | 348/222.1 |
| 2009/0002398 A1 | * | 1/2009 | Goerzen | 345/660 |
| 2009/0115860 A1 | * | 5/2009 | Nakashima et al. | 348/208.99 |

FOREIGN PATENT DOCUMENTS

| | | |
|---|---|---|
| KR | 10-2005-0022748 | 3/2005 |
| KR | 10-2005-0023549 | 3/2005 |
| KR | 10-2005-0076824 | 7/2005 |

* cited by examiner

*Primary Examiner* — Lin Ye
*Assistant Examiner* — Mekonnen Dagnew
(74) *Attorney, Agent, or Firm* — The Nath Law Group; Joshua B. Goldberg

(57) ABSTRACT

An apparatus for digital image stabilization according to the present invention comprises an image signal processing module for receiving image signals generated under first and second exposure value conditions (first exposure value condition>second exposure value condition) from an image sensor, and outputting digital image signals of a first size and a second size (first size<second size) corresponding to the first exposure value condition and the second exposure value condition, respectively; and an applied image processing module for determining adaptively the second exposure value condition from the first exposure value condition, changing an exposure attribute of the image sensor from the first exposure value condition to the second exposure value condition, receiving the image signals of the first size and the second size, and correcting a property of the image signal of the second size based on the image signal of the first size.

20 Claims, 4 Drawing Sheets

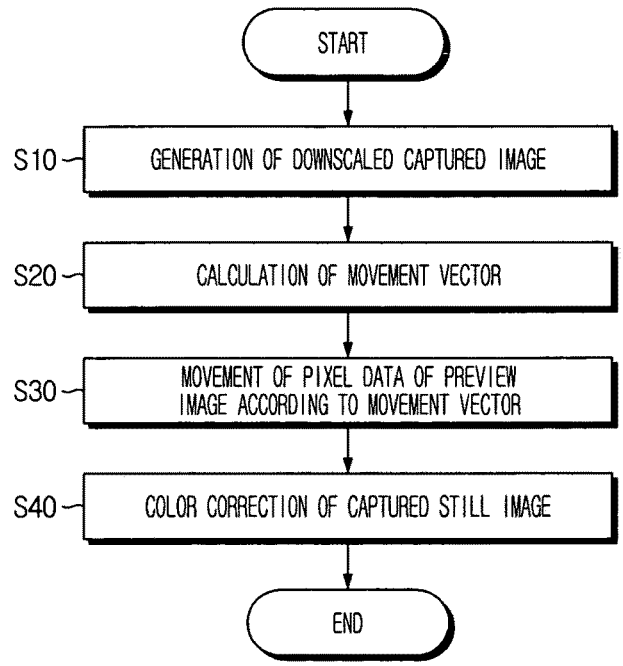
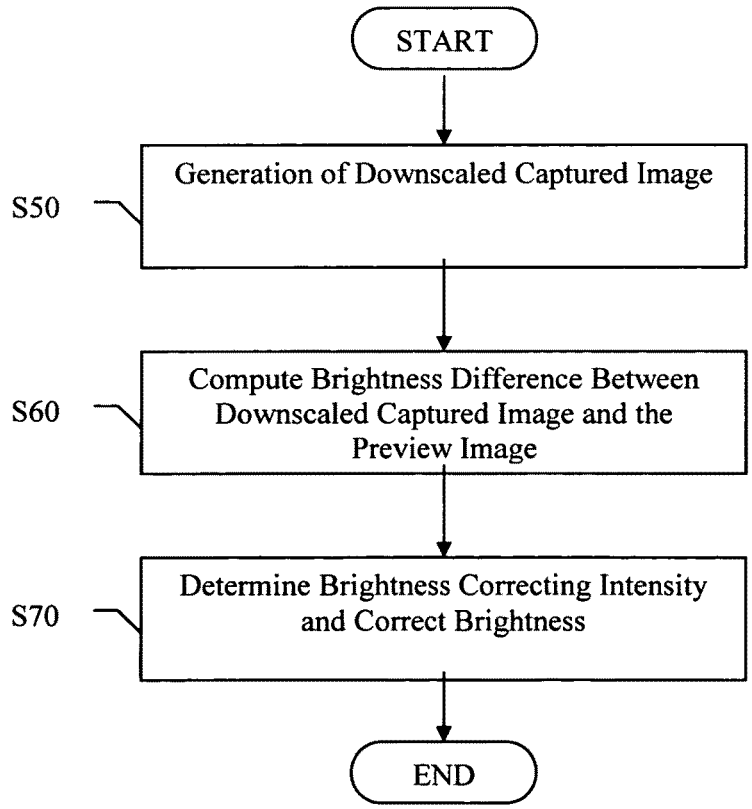

APPARATUS FOR DIGITAL IMAGE STABILIZATION, METHOD USING THE SAME AND COMPUTER READABLE MEDIUM STORED THEREON COMPUTER EXECUTABLE INSTRUCTIONS FOR PERFORMING THE METHOD

CLAIM OF PRIORITY

This application claims priority under 35 USC §119(a) to Korean Patent Application No. 10-2007-0046024, filed on May 11, 2007, in the Korean Intellectual Property Office, the entire contents of which are hereby incorporated by reference.

TECHNICAL FIELD

The present invention relates to digital image processing, and in particular, to method and apparatus for digital image stabilization that can correct an image blurring phenomenon caused by shaky hands at the time of obtaining a digital image.

BACKGROUND

Recently, a digital camera using an image sensor CCD (Charge Coupled Device) or CMOS (Complementary Metal-Oxide Semiconductor) is widely used. The digital camera is commercialized as a camera-only-product, and besides is mounted in a hand-held terminal such as a mobile phone or PDA.

However, the central processing unit of the hand-held terminal does not have as good a clock speed and memory capacity as that of a personal computer. And, development trends of the hand-held terminal move toward thickness and size reduction of the terminal. In this context, the terminal has a spatial limitation in mounting an additional device such as a camera. Further, there are limitations in applying various image processing techniques intended for a camera-only-product to a hand-held terminal, for example a digital image stabilization technique for preventing deterioration of a digital image caused by shaky hands of a photographer.

As well known, a digital camera supports an auto exposure mode. In the auto exposure mode, EV (Exposure Value) is automatically changed depending on luminance of a place to take a photograph. That is, EV is increased in a dark place and reduced in a bright place.

However, an increase in EV causes an increase in exposure time of the camera to a subject. In this case, an image blurring phenomenon occurs that a minute tweak of a focus caused by shaky hands is reflected on a photograph. To prevent the image blurring phenomenon, conventionally various image stabilization techniques were introduced, for example DIS (Digital Image Stabilization), EIS (Electrical Image Stabilization) or OIS (Optical Image Stabilization).

The DIS technique detects/compensates for a camera movement using an image signal stored in a memory. The DIS technique detects a movement vector using an image signal that is generated in an image pickup device and stored in a memory, and changes a read timing of the memory using the detected movement vector to compensate for a camera movement.

The DIS technique has an advantage of simple image stabilization. However, because a read timing of a memory is changed, a size of an image readable from the memory is equal to that of an effective pixel area. Thus, the DIS technique should expand an image read from the memory by digital zoom and play/record the expanded image, which results in deterioration of quality of an image.

The EIS technique detects/compensates for a camera movement using an angular velocity sensor and a high pixel image pickup device. The EIS technique detects the amount and direction of a camera movement using a horizontal/vertical angular velocity sensor, and changes an output timing of a high pixel image pickup device using the detected amount and direction of camera movement to compensate for the camera movement.

As an output timing of a high pixel image pickup device is changed, size of an image that is composed of an image signal output from the high pixel image pickup device is equal to that of an original image. This is because the high pixel image pickup device used in the EIS technique has more whole number of pixels than the number of effective pixels. Thus, the EIS technique can prevent deterioration of quality of the played/recorded image. However, the EIS technique requires an angular velocity sensor and a high pixel image pickup device, which results in an increase in manufacturing costs.

The OIS technique detects/compensates for a camera movement using an angular velocity sensor and a prism. The OIS technique is the same as the EIS technique in that the amount and direction of a camera movement is detected using a horizontal/vertical angular velocity sensor. However, there is a difference in that the OIS technique uses a prism capable of changing a path of light incident upon an image pickup device to compensate for a camera movement.

The OIS technique does not suffer deterioration of quality of the played/recorded image and does not require a high image pickup device. However, the OIS technique requires an angular velocity sensor and a prism, which increases the volume of a photographing device and manufacturing costs. Further, the OIS technique has difficulty in controlling the prism.

SUMMARY

The present invention was designated to solve the above-mentioned problems. An object of the present invention is to provide a method for digital image stabilization that eliminates the need for a separate hardware to compensate for a camera movement, such as an angular velocity sensor or a prism.

Another object of the present invention is to provide a method for digital image stabilization that prevents deterioration of quality of an image and an image blurring phenomenon in a digital camera mounted in a terminal having a limited hardware resource, such as a mobile phone or PDA.

A still another object of the present invention is to provide an apparatus for digital image stabilization implementing the above-mentioned method and a digital photographing device having the same.

A yet another object of the present invention is to provide a computer readable medium stored thereon computer executable instructions for performing the method.

To achieve the above-mentioned objects, an apparatus for digital image stabilization according to the present invention comprises an image signal processing module for receiving image signals generated under first and second exposure value conditions (first exposure value condition>second exposure value condition) from an image sensor, and outputting digital image signals of a first size and a second size (first size<second size) corresponding to the first exposure value condition and the second exposure value condition, respectively; and an applied image processing module for determining adaptively the second exposure value condition from the first exposure value condition, changing an exposure attribute of the image sensor from the first exposure value condition to the second exposure value condition, receiving the image signals of the first size and the second size, and correcting a property of the image signal of the second size based on the image signal of the first size.

To achieve the above-mentioned objects, a method for digital image stabilization according to the present invention comprises (a) obtaining a digital image of a first size under a first exposure value condition from an image sensor; (b) determining adaptively a second exposure value condition (smaller than the first exposure value condition) based on the first exposure value condition; (c) obtaining a digital image of a second size (larger than the first size) under the second exposure value condition from the image sensor; and (d) correcting a property of an image signal of the second size based on an image signal of the first size.

Preferably, the first exposure value condition is an exposure value condition of an auto exposure mode, and the second exposure value condition is an exposure value condition corresponding to lower illuminance than illuminance of the auto exposure mode. The first and second exposure value conditions are defined by parameters including a shutter speed 'f' and ISO (International Standards Organization) gain 'I'.

Preferably, the image signal of the first size is a preview image signal obtained in the auto exposure mode, and the preview image signal is an image signal generated at the latest time before an operation of a shutter, where an image is generated at a regular frame interval in a preview mode.

Preferably, the image signal of the second size is a captured still image signal obtained in an image capture mode.

The apparatus for digital image stabilization according to the present invention further comprises a sensor controller for changing an exposure value condition of the image sensor; and an exposure value lookup table for selecting the second exposure value condition based on the first exposure value condition, wherein the applied image processing module determines the second exposure value condition corresponding to the first exposure value condition by referencing the exposure value lookup table, and controls the sensor controller to change the exposure value condition of the image sensor to the second exposure value condition.

In the present invention, the image signal processing module may encode only the image signal of the second size, and the applied image processing module may decode the image signal of the second size before correcting the property of the image signal of the second size.

Preferably, the applied image processing module includes a color correcting unit. The color correcting unit replaces pixel data of the image of the second size with pixel data of the image of the first size image, or interpolates pixel data of the image of the second size based on pixel data of the image of the first size in consideration of a size ratio between the image of the second size and the image of the first size, so as to correct color of the image of the second size.

More specifically, the color correcting unit scales a size of the image of the second size to a size of the image of the first size to generate a downscaled image, calculates a movement vector of the downscaled image using the image of the first size as a reference image, and replaces pixel data of the image of the second size with pixel data of the image of the first size, or interpolates pixel data of the image of the second size based on pixel data of the image of the first size in consideration of the movement vector and a scaling factor of the downscaled image.

Preferably, the applied image processing module further includes a brightness correcting unit. The brightness correcting unit computes quantitatively a difference in brightness between the image of the first size and the image of the second size, selects adaptively a brightness correcting intensity, and corrects brightness of the image of the second size by the selected intensity.

According to an aspect of the present invention, the brightness correcting unit scales a size of the image of the second size to a size of the first size image to generate a downscaled image, calculates a difference in average values of histograms between the downscaled image and the image of the first size, selects adaptively a brightness correcting intensity based on the difference in average values of histograms, and corrects brightness of the image of the second size by the selected intensity.

According to another aspect of the present invention, the brightness correcting unit selects adaptively a brightness correcting intensity based on a difference between parameters that define the exposure value conditions used to generate the image of the first size and the image of the second size, and corrects brightness of the image of the second size by the selected intensity.

To achieve the above-mentioned objects, a computer readable medium is provided that stores computer executable instructions thereon for performing the method for digital image stabilization.

BRIEF DESCRIPTION OF THE DRAWINGS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

FIG. 2 is a flow chart illustrating a process, in which a color correcting unit of an applied image processing module corrects color of a captured still image based on a preview image.

FIG. 3 is a flow chart illustrating a process, in which a brightness correcting unit of the applied image processing module corrects brightness of the captured still image based on the preview image.

DETAILED DESCRIPTION

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

An apparatus for digital image stabilization according to the present invention is mounted in various digital photographing devices. Here, the digital photographing device includes a digital camera, a digital camcorder, a mobile phone with built-in digital camera, PDA or a personal multimedia player, and is configured to obtain an image of a subject by operation of a shutter, convert the obtained image into a digital image and store the digital image in a storage medium. Unlike a conventional camera, the commercial digital photographing device supports a preview function for viewing ahead an image of a subject to be included in a photograph through a view finder having a display such as LCD. Thus, a user checks ahead an image changing at a short frame interval according to movement of the digital photographing device through the view finder in a preview mode, and when the user catches a desired optimum image, the user operates a shutter to obtain a digital still image of the subject. Here, the apparatus for digital image stabilization according to the present invention prevents deterioration of quality of a digital still image that may occur due to shaky hands using a preview image obtained at the time of operation of the shutter.

Figure 1:
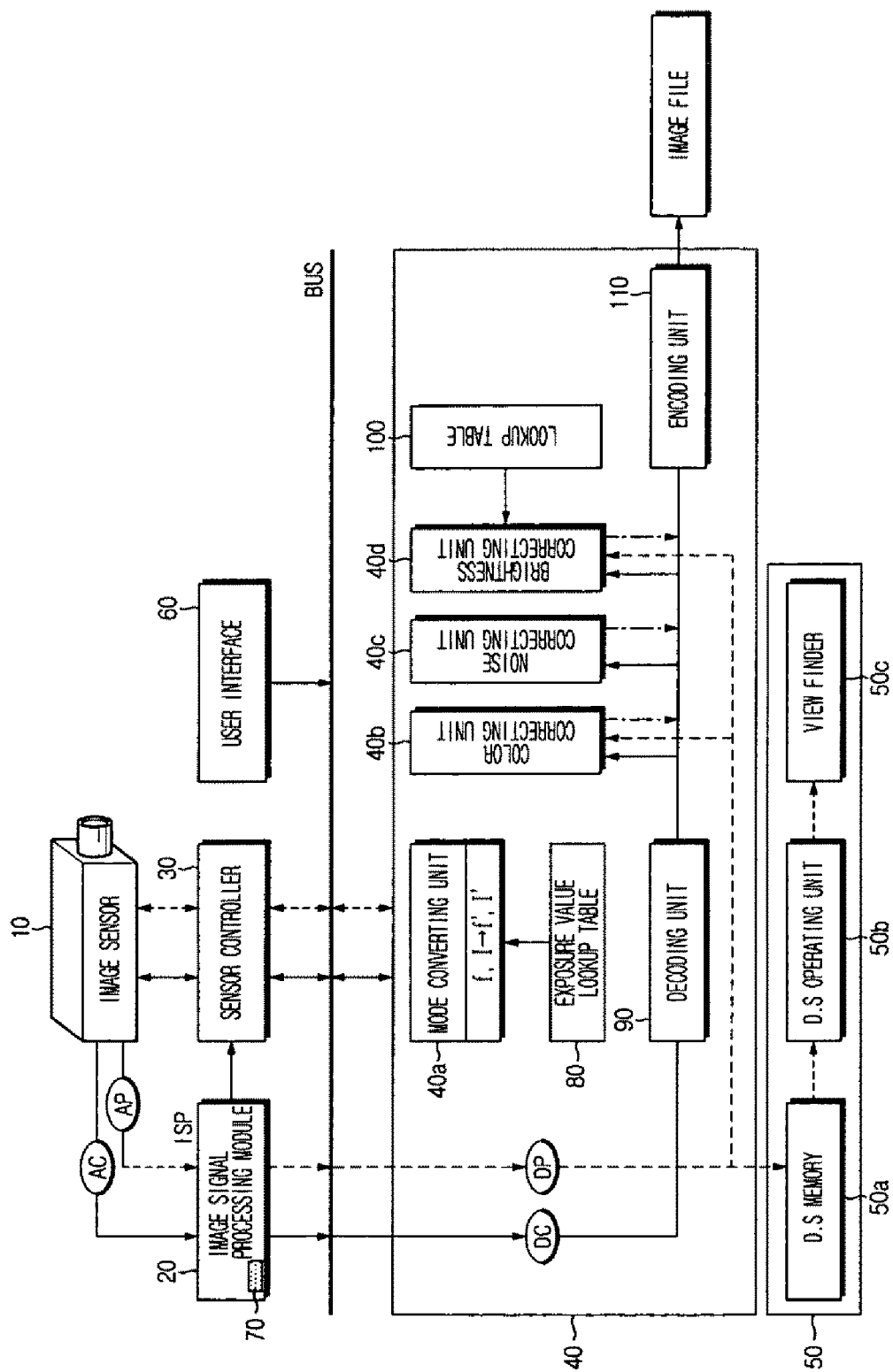
FIG. 1 is a block diagram illustrating an apparatus for digital image stabilization according to a preferred embodiment of the present invention.

FIG. 1 is a block diagram illustrating the apparatus for digital image stabilization according to a preferred embodiment of the present invention.

Referring to FIG. 1, the apparatus for digital image stabilization according to the present invention is mounted in various digital photographing devices and performs an image stabilization function, and the apparatus comprises an image sensor 10, an image signal processing module 20, a sensor controller 30, an applied image processing module 40, an image display module 50 and a user interface 60.

The image sensor 10 picks up an image of a subject and outputs an analogue image signal of the image to the image signal processing module 20. Preferably, the image sensor 10 is an image pickup device such as CCD (Charge Coupled Device) or CMOS (Complementary Metal-Oxide Semiconductor). However, the present invention is not limited to a specific kind of image sensor.

The image sensor 10 generates and outputs a preview image (AP) of the subject at a short frame interval before a shutter of the digital photographing device operates. Meanwhile, when the shutter of the digital photographing device operates, the image sensor 10 outputs a captured still image (AC) of the subject. The preview image (AP) and the captured still image (AC) are generated under first and second exposure value conditions, respectively. Here, the exposure value is abbreviated to EV, and is defined by parameters including 'f' representing a shutter speed of the image sensor 10 and ISO gain (hereinafter referred to as 'I') representing sensitivity of the image sensor 10. The exposure value of the image sensor 10 is set by the sensor controller 30. As the exposure value increases, an exposure time of the image sensor 10 increases. Specific 'f' and 'I' values corresponding to a specific exposure value are defined in advance by a manufacturing company of the image sensor 10 and referred to in the form of a lookup table.

Preferably, the first exposure value is larger than the second exposure value condition. That is, when the first exposure value is EV1 and the second exposure value is EV2, a condition of 'EV1>EV2' is satisfied. Preferably, the first exposure value is an exposure value corresponding to an auto exposure mode of the digital photographing device. Alternatively, the first exposure value may be set arbitrarily by a user through the user interface 60 or may be increased or decreased as much as a preset width based on an exposure value corresponding to the auto exposure mode. The increase or decrease width is set to a preferable value by a manufacturing company of the digital photographing device.

Preferably, the preview image (AP) generated under the first exposure value condition is an image generated latest at the time of operation of the shutter in a moving image of the subject provided through a view finder 50c of the display module 50 in the preview mode before the shutter of the digital photographing device operates. For reference, the preview image (AP) is stored in a display memory 50a by the applied image processing module 40, and the stored preview image (AP) is outputted in the form of a moving image through a display of the view finder 50c by a display operating unit 50b.

The preview image (AP) is generated continuously at a very short frame interval. Accordingly, the preview image (AP) obtained in the first exposure value condition is free of an image blurring phenomenon caused by shaky hands of a photographer. The preview image (AP) has the substantially same range of a subject included therein as an image obtained through operation of the shutter. And, the preview image (AP) is generated in the auto exposure mode, and thus retains well brightness and color properties of a subject.

Meanwhile, the captured still image (AC) is an image obtained in the second exposure value condition when the shutter of the digital photographing device operates. The captured still image (AC) is obtained in a condition of sufficiently shorter exposure time to a subject than the first exposure value condition of the preview image (AP). Thus, the captured still image (AC) is hardly influenced by shaky hands. As the exposure time of the image sensor 10 reduces, the influence of shaky hands reduces. However, if the exposure time reduces when the captured still image (AC) is obtained, the captured still image (AC) does not retain brightness and color properties of a subject so well as the preview image (AP) does.

The image signal processing module 20 receives the analogue image signal outputted from the image sensor 10, converts the analogue image signal into a digital image signal and outputs the digital image signal to the applied image processing module 40. The digital image signal includes a brightness signal (Y) and color difference signals (Cb and Cr) of a pixel included in the image. The digital image signal may be a signal in other color coordinate systems than YVU (YCbCr) color coordinate system, for example RGB (Red, Green, Blue).

Before the shutter of the digital photographing device operates, the image signal processing module 20 receives the preview image (AP) generated in the image sensor 10 at a regular frame interval, converts the preview image (AP) into a digital image signal and downscales the digital image signal in conformity of a standard definition (for example, 320*240 or 240*320) of the display of the view finder 50c. Meanwhile, when the shutter of the digital photographing device operates, the image signal processing module 20 receives the captured still image (AC) generated in the image sensor 10, converts the captured still image (AC) into a digital image signal and downscales the digital image signal in conformity of definition (320*240 or 256*192) set by the photographer. The preview image (DP) and the captured still image (DC) processed by the image signal processing module 20 are outputted to the applied image processing module 40. A size of the preview image (DP) is downscaled to a size of the display of the view finder 50*c*, and thus is smaller than that of the captured still image (DC). Meanwhile, the downscaling of the preview image (DP) and the captured still image (DC) may be performed by the applied image processing module 40.

The image signal processing module 20 may include an image encoding unit 70 for encoding the digital image signal. Preferably, the image encoding unit 70 encodes the digital image signal by the JPEG (Joint Photographic Experts Group) standards. However, the present invention is not limited in this regard. The image encoding unit 70 can encode only the captured still image (DC) converted into a digital image signal, and in some cases, an image encoding process may be omitted.

The image signal processing module 20 is known as ISP (Image Signal Processor) in the prior art and a digitalizing process of an image signal is well known to an ordinary person, and thus its detailed description is herein omitted.

The sensor controller 30 sets an exposure value condition of the image sensor 10 by the control of the applied image processing module 40. The sensor controller 30 sets the image sensor 10 to the first exposure value condition before the shutter of the photographing device operates. And, when the shutter operates, the sensor controller 30 sets the image sensor 10 to the second exposure value condition. The sensor controller 30 receives parameters corresponding to the first and second exposure value conditions from the applied image processing module 40. As mentioned above, the parameters include the shutter speed 'f' and ISO gain 'l'.

The applied image processing module 40 operates in a preview mode before operation of the shutter, and operates in a still image capture mode after operation of the shutter. For this purpose, the applied image processing module 40 includes a mode converting unit 40*a*. Before operation of the shutter, the mode converting unit 40*a* controls the sensor controller 30 to set the image sensor 10 to the first exposure value condition and operate the image sensor 10 in the preview mode. Accordingly, the image sensor 10 generates the preview image (AP) at a predetermined frame interval and outputs the preview image (AP) to the image signal processing module 20. Then, the applied image processing module 40 receives the preview image (DP) that is generated periodically in the first exposure value condition and digitalized, from the image signal processing module 20, and stores the preview image (DP) in the display memory 50*a*. The stored preview image (DP) is outputted in the form of a moving image through the display of the view finder 50*c*.

Meanwhile, when a shutter operates, the mode converting unit 40*a* reads the preview image (DP) generated latest at the time of operation of the shutter from the display memory 50*a* to obtain the preview image (DP). Next, the mode converting unit 40*a* determines adaptively the second exposure value condition from the first exposure value condition, and controls the sensor controller 30 to change an exposure value condition of the image sensor 10 from the first exposure value condition to the second exposure value condition, thereby converting into a still image capture mode.

Here, the determining adaptively the exposure value condition means determining variably the second exposure value condition according to the first exposure value condition with reference to a preset reference exposure value. For this purpose, preferably an exposure value lookup table 80 is provided to map parameters for defining the second exposure value condition, i.e. 'f' and 'l' values one to one according to parameters for defining the first exposure value condition, i.e. 'f' and 'l' values. The exposure value lookup table 80 is stored in a registry and is referred to when the applied image processing module 40 operates. Meanwhile, the present invention is characterized by determining adaptively the second exposure value condition according to the first exposure value condition, and a technical configuration for determining adaptively an exposure value condition is not limited to the above-mentioned example and may have various modifications.

When the exposure value condition of the image sensor 10 is converted into the second exposure value condition, the applied image processing module 40 controls the sensor controller 30 to send the still image capturing signal to the image sensor 10. Then, the image sensor 10 generates the captured still image (AC) of the subject and outputs the captured still image (AC) to the image signal processing module 20. The image signal processing module 20 receives, digitalizes, scales and outputs the captured still image (AC) to the applied image processing module 40. The applied image processing module 40 receives the captured still image (DC) and corrects various image properties of the captured still image (DC) using the preview image (DP) obtained in the preview mode. Meanwhile, as mentioned above, the image signal processing module 20 may encode and output the captured still image (DC). In this case, it is preferable to decode the captured still image (DC) before correcting the properties of the captured still image (DC). For this purpose, the applied image processing module 40 may further include a decoding unit 90 for decoding the captured still image (DC) signal outputted from the image signal processing module 20.

Preferably, the properties of the captured still image (DC) corrected by the preview image (DP) are color, noise and brightness. For this purpose, the applied image processing module 40 includes a color correcting unit 40*b*, a noise correcting unit 40*c* and a brightness correcting unit 40*d*. Preferably, the properties of the captured still image (DC) are corrected in the order of color, noise and brightness. However, the present invention is not limited to a specific correcting order, and thus the properties of the captured still image (DC) may be corrected in an arbitrary correcting order, which is obvious to the ordinary person.

FIG. 2 is a flow chart illustrating a process, in which the color correcting unit 40*b* of the applied image processing module 40 corrects color of the captured still image (DC) based on the preview image (DP).

The color correcting process is described with reference to FIGS. 1 and 2. First, the color correcting unit 40*b* scales a size of the captured still image (DC) to a size of the preview image (DP) to generate a downscaled captured image (S10). Next, the color correcting unit 40*b* calculates a movement vector of the downscaled captured image using the preview image (DP) as a reference image (S20). The movement vector indicates a movement direction and a movement amount of the subject included in the downscaled captured image based on the preview image (DP). The movement vector may be calculated in a typical manner of well-known image compression standards such as MPEG (Moving Picture Experts Group) or H.26x. That is, the movement vector is calculated in such a way that the downscaled captured image is divided into blocks of uniform size, and an area from which a reference image was moved is inferred. After the movement vector is calculated, the color correcting unit 40*b* moves a location of each pixel data of the preview image (DP) according to the movement vector (S30). Then, the color correcting unit 40*b* corrects the pixel data of the captured still image (DC) using an interpolation method based on the preview image (DP) generated by applying a location movement process of each pixel data in the step S30 (S40). That is, the color correcting unit 40b converts a location ($x_i$, $y_j$) of each pixel data of the preview image (DP) into a location ($X_I$, $Y_J$) of the captured still image (DC) in consideration of a scaling factor (applied when generating the downscaled captured image). Next, the color correcting unit 40b replaces the pixel data corresponding to the location ($X_I$, $Y_J$) of the captured still image (DC) with the pixel data corresponding to the location ($x_i$, $y_j$) of the preview image (DP). Meanwhile, the number of pixels of the preview image (DP) is smaller than that of the captured still image (DC), and thus all pixel data of the captured still image (DC) is not replaced by pixel data of the preview image (DP). Accordingly, the color correcting unit 40b interpolates pixel data of the captured still image (DC) that is not replaced by pixel data of the preview image (DP) using adjacent replaced pixel data. The interpolation method includes Bi-linear, Bi-Cubic or B-spline, however the present invention is not limited in this regard.

The color-corrected captured still image (DC) passed through the above-mentioned process is inputted to the noise correcting unit 40c of the applied image processing module 40. Then, the noise correcting unit 40c removes noise and a false color of the captured still image (DC) using various well-known noise filters. The filter includes a low pass filter, a Median filter, a Gaussian filter, a Laplacian of Gaussian filter or a Difference of Gaussian filter. However, the present invention is not limited in this regard, and it is obvious that other filtering techniques known to the ordinary person may be used to remove noise.

The captured still image (DC) passed through removal of noise and a false color as mentioned above is inputted to the brightness correcting unit 40d. Then, the brightness correcting unit 40d computes quantitatively a difference in brightness between the preview image (DP) and the captured still image (DC), and determines adaptively a brightness correcting intensity to correct brightness of the captured still image (DC).

FIG. 3 is a flow chart illustrating a process, in which the brightness correcting unit 40d of the applied image processing module 40 corrects brightness of the captured still image (DC) based on the preview image (DP).

The brightness correcting process is described with reference to FIGS. 1 and 3. First, the brightness correcting unit 40d downscales a size of the captured still image (DC) to a size of the preview image (DP) to generate a downscaled captured image (S50). At this time, the step S50 need not be performed separately, and the downscaled captured image generated for color correction of the captured still image (DC) may be used instead. Next, the brightness correcting unit 40d computes quantitatively a difference in brightness between the downscaled captured image and the preview image (DP) (S60). The difference in brightness may be calculated using a difference in average values of histograms between the two images. For example, in the case that average values of histograms of the downscaled captured image and the preview image (DP) are '85' and '140', respectively, the difference in average values is '55'. Next, the brightness correcting unit 40d determines adaptively a brightness correcting intensity according to the difference in average values, and corrects brightness of the captured still image (DC) by the determined intensity (S70). A gamma function or a Retinex algorithm may be applied to the brightness correction. In this case, the brightness correcting intensity is an intensity of a gamma function or Retinex algorithm. To select adaptively an intensity of a brightness correcting algorithm, it is preferable to prepare an intensity level selectable according to the difference in average values in the form of a lookup table 100 and refer to the lookup table 100.

Meanwhile, a difference in brightness between the captured still image (DC) and the preview image (DP) may be computed quantitatively by a difference between parameters that define the first exposure value and the second exposure value. That is, in the case that 'f' and 'I' values corresponding to the first exposure value are '⅓₀' and '200', respectively, and 'f' and 'I' values corresponding to the second exposure value are '⅙₀' and '100', respectively, differences in shutter speed and ISO gain are computed quantitatively as '⅙₀' and '100', respectively. Next, the brightness correcting unit 40d determines adaptively a brightness correcting intensity by the differences in 'f' and 'I' values and corrects brightness of the captured still image (DC). A gamma function or a Retinex algorithm may be applied to the brightness correction in the same way as the above-mentioned embodiment. In this case, the brightness correcting intensity is an intensity of a gamma function or Retinex algorithm. To select adaptively an intensity of a brightness correcting algorithm, it is preferable to prepare an intensity level selectable according to the differences in 'f' and 'I' values in the form of a lookup table 100 and refer to the lookup table 100.

Meanwhile, the gamma function or Retinex algorithm used to correct brightness of the captured still image (DC) in the present invention is widely known in the prior art, and thus its detailed description is herein omitted. Meanwhile, the present invention is not limited to a specific kind of brightness correcting function or algorithm, and various well-known theories for adjusting brightness of the captured still image (DC) may be applied.

After the color correcting unit 40b, noise correcting unit 40c and brightness correcting unit 40d correct color, noise and brightness of the captured still image (DC), respectively, the captured still image (DC) is encoded and outputted to the external. For this purpose, the applied image processing module 40 further includes an encoding unit 110 for encoding the captured still image (DC). Preferably, the encoding unit 110 encodes the captured still image (DC) by the JPEG standards to generate an image file and outputs the image file to the external. However, the present invention is not limited to a specific encoding method of the captured still image (DC). The image file outputted to the external may be stored in an inactive storage medium of the digital photographing device, such as a flash memory.

The user interface 60 is an interface provided generally to a digital photographing device to adjust various parameters necessary for obtaining a digital image, for example focus, optical or digital zoom-in/zoom-out, white balance or exposure mode of a digital camera, and to operate a shutter. In the case that the digital photographing device is mounted in a hand-held terminal such as a mobile phone, the user interface 60 may be embodied as a keypad of the hand-held terminal.

Hereinafter, a digital photographing process using the apparatus for digital image stabilization configured as mentioned above is described in detail. The below-mentioned description is made on the assumption that a photographing mode is initiated through manipulation of the user interface 60 after operation of the digital photographing device.

Figure 4:
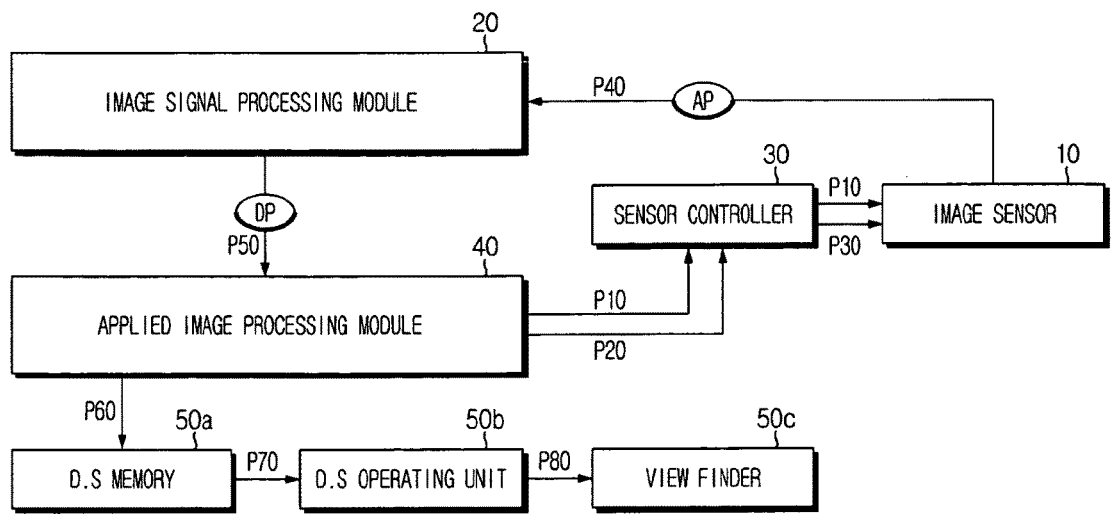
FIG. 4 is a control flow chart from generation of the preview image in a preview mode to outputting of the preview image through a view finder.

FIG. 4 is a control flow chart from generation of the preview image in the preview mode to outputting of the preview image through the view finder 50c.

Referring to FIGS. 1 and 4, when the photographing mode starts, the applied image processing module 40 controls the sensor controller 30 to set the image sensor 10 to the first exposure value condition (P10). The parameters for defining an exposure value, such as a shutter speed 'f' and ISO gain 'l' refer to the exposure value lookup table 80 registered in the registry when operation of the digital photographing device is initialized. Preferably, the first exposure value condition is an exposure value condition corresponding to an auto exposure mode. Alternatively, the first exposure value condition may be set arbitrarily by a user through the user interface 60.

When the image sensor 10 is set to the first exposure value condition, the applied image processing module 40 requests generation of a preview image (AP) to the sensor controller 30 (P20). Then, the sensor controller 30 sends periodically a preview image generation signal to the image sensor 10 (P30). Then, the image sensor 10 outputs the preview image (AP) of a subject to the image signal processing module 20 in the form of an analogue image signal at a regular frame interval (P40). The image signal processing module 20 digitalizes the preview image (AP) signal outputted periodically from the image sensor 10, downscales the digitalized image signal to a size of the display of the view finder 50c, and outputs the downscaled image to the applied image processing module 40 (P50). Next, the applied image processing module 40 receives the preview image (DP) and stores periodically the preview image (DP) in the display memory 50a (P60). Meanwhile, the display operating unit 50b reads the preview image (DP) stored periodically in the display memory 50a (P70). Next, the display operating unit 50b converts the preview image (DP) into an analogue image signal and outputs the preview image at a regular interval through the display of the view finder 50c (P80).

Figure 5:
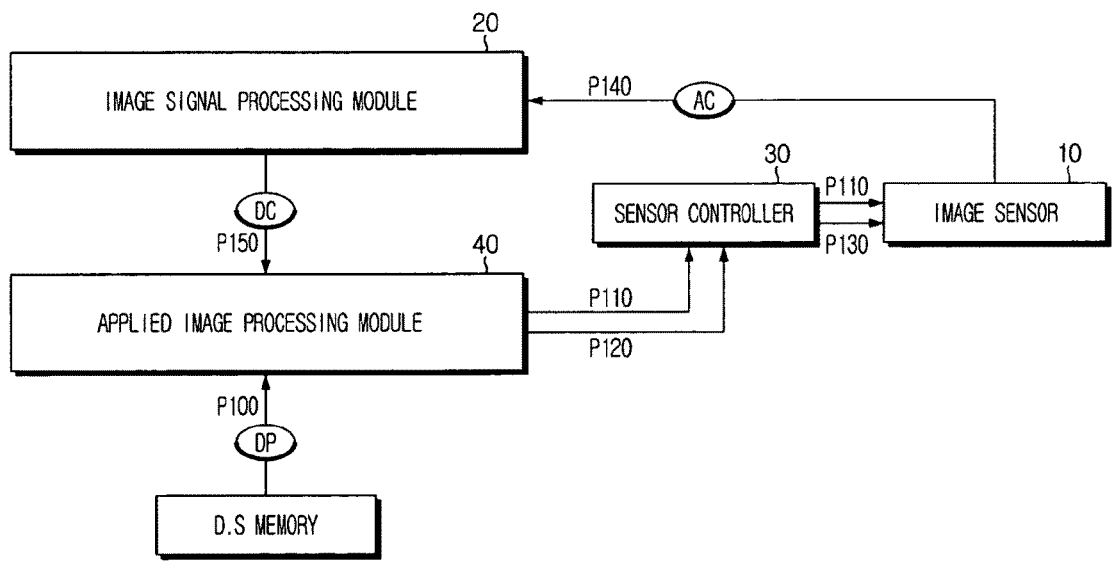
FIG. 5 is a control flow chart to describe the process of obtaining the captured still image of a subject when a shutter of a digital photographing device operates, and the preview image used as a reference image for correction of the captured still image.

FIG. 5 is a control flow chart to describe the process of obtaining the captured still image (DC) of the subject at the time of shutter operation of the digital photographing device and the preview image (DP) used as a reference image for correction of the captured still image (DC).

Referring to FIGS. 1 and 5, when a photographer catches an optimum image in the preview image outputted through the display of the view finder 50c and operates the shutter, first, the applied image processing module 40 changes an image processing mode from a preview mode to a still image capture mode. Next, the applied image processing module 40 reads the preview image (DP) generated latest at the time of operation of the shutter from the display memory 50a to obtain the preview image (DP) (P100). Next, the applied image processing module 40 determines adaptively the second exposure value condition from the first exposure value condition, and controls the sensor controller 30 to set the image sensor 10 to the second exposure condition (P110). A configuration for calculating the second exposure value condition from the first exposure value condition is as mentioned above.

When the image sensor 10 is set to the second exposure value condition, the applied image processing module 40 requests generation of a captured still image (AC) to the sensor controller 30 (P120). The sensor controller 30 sends the captured still image generating signal to the image sensor 10 (P130). Then, the image sensor 10 outputs the full-size captured still image (AC) of the subject to the image signal processing module 20 in the form of an analogue image signal (P140). The image signal processing module 20 digitalizes the captured still image (AC) outputted from the image sensor 10, scales a size of the digitalized image to a size of an image set by the user through the user interface 60, and outputs the scaled image to the applied image processing module 40 (P150). Then, the applied image processing module 40 receives the captured still image (DC), so that the preview image (DP) used as a reference image for correction and the captured still image (DC) are both obtained.

When the applied image processing module 40 obtains the preview image (DP) generated under the first exposure value condition and the captured still image (DC) generated under the second exposure value condition through the above-mentioned process, a process for correcting the captured still image (DC) based on the preview image (DP) is performed.

That is, as mentioned above, a size of the captured still image (DC) is downscaled to a size of the preview image (DP), a movement vector of the downscaled captured image is calculated while the preview image (DP) is used as a reference image, and pixel data of the captured still image (DC) is replaced by pixel data of the preview image (DP) or pixel data of the captured still image (DC) is interpolated with pixel data of the preview image (DP) in consideration of the movement vector and the scaling factor used to generate the downscaled captured image. Next, various noise and false colors of the captured still image (DP) are removed using well-known noise filters. Next, a brightness correcting intensity is selected by a difference in parameters for defining brightness or exposure value between the preview image (DP) and the captured still image (DC), and brightness of the captured still image (DC) is corrected.

As mentioned above, the present invention obtains the captured still image (DC) in an exposure value condition having little influence of shaky hands, corrects color and brightness of the captured still image (DC) using the preview image (DP) that is generated at a short frame interval, consequently is little influenced by shaky hands and retains well brightness and color properties of a subject, and removes noise and a false color involved in correcting color through a filter, and thus, the present invention can obtain a digital image of good quality, free of an image blurring phenomenon caused by shaky hands.

Figure 6:
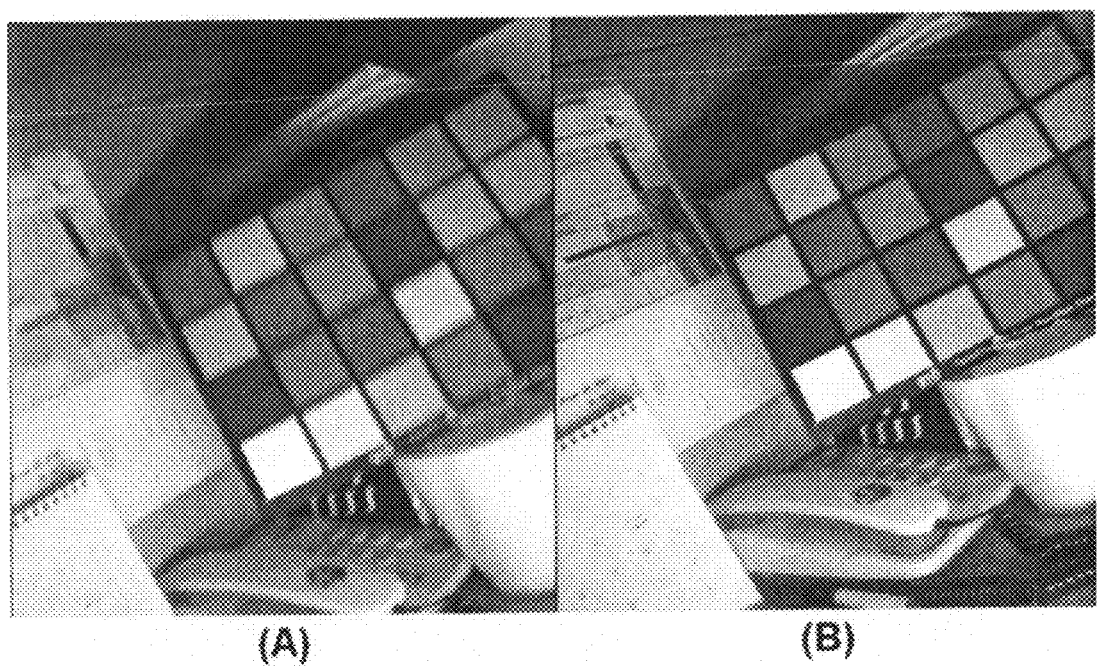
FIG. 6 is a view for comparison of an image (A) taken by a typical digital photographing device without an image stabilization function in an auto exposure mode with an image (B) taken by a digital photographing device implementing the method for digital image stabilization according to the present invention.

FIG. 6 is a view for comparison of an image (A) taken by a typical digital photographing device without an image stabilization function in an auto exposure mode with an image (B) taken by a digital photographing device implementing the method for digital image stabilization according to the present invention. As shown in FIG. 6, the image obtained according to the method of the present invention is free of an image blurring phenomenon, and is brighter and clearer.

Meanwhile, the above-mentioned embodiment shows that the image signal processing module 20 and the applied image processing module 40 are separated from each other according to function. However, the image signal processing module 20 and the applied image processing module 40 may be integrated into a single module or sub-element included in the applied image processing module 40 may be constructed as a separate module. Further, the scaling factor of the preview image (DP) is not limited by a size of the display of the view finder 50c. Thus, the scaling factor of the preview image (DP) may vary depending on a size of the captured still image (DC) to be corrected. For example, the scaling factor of the preview image (DP) may be adjusted such that the width and height of the captured still image (DC) is integral number times as much as those of the preview image (DC). In this case, it is advantageous to reduce a calculation amount in mapping locations of pixel data of the preview image (DP) and the captured still image (DC) when correcting color of the captured still image (DC).

The above-mentioned method for digital image stabilization according to the present invention may be incorporated as a computer readable code in a computer readable medium. The computer readable medium includes all kinds of storage devices for storing data readable by a computer system. For example, the computer readable medium is ROM, RAM, CD-ROM, a magnetic tape, a floppy disc or an optical data storage device, and may be incorporated in the form of a carrier wave (for example, transmission via the Internet). And, the computer readable medium may store and execute a code that is dispersed in computer systems connected to each other via a network and is readable by a computer through a dispersion method. Further, function program, code and code segments for implementing the method for digital image stabilization may be easily inferred by programmers in the prior art.

Only a few implementations and examples are described and other implementations, enhancements and variations can be made based on what is described and illustrated in this application.

According to an aspect of the present invention, unlike EIS or OIS technique, the present invention can prevent an image blurring phenomenon caused by shaky hands without a hardware for measuring a degree of shaky hands, such as an angular velocity sensor or a prism, consequently reduce manufacturing cost of a digital photographing device and obtain a digital still image of good quality.

According to other aspect of the present invention, unlike DIS technique, the present invention does not involve digital zoom when storing a captured still image, and thus can obtain a digital still image of better quality than that of DIS technique.

According to another aspect of the present invention, the present invention corrects a captured still image using a preview image that retains well brightness and color properties of a subject, and thus can obtain a clearer and brighter digital still image.

According to still another aspect of the present invention, the present invention removes noise occurring when correcting color data of a captured still image by color data of a preview image using a filter, thereby preventing deterioration of quality of an image due to noise.

What is claimed is:

1. An apparatus for digital image stabilization, comprising:
an image signal processing module for receiving image signals generated under a first and a second exposure value conditions from an image sensor where the first exposure value condition is greater than the second exposure value condition and outputting digital image signals of a first size and a second size corresponding to the first exposure value condition and the second exposure value condition, respectively, where the first size is smaller than the second size; and
an applied image processing module for determining adaptively the second exposure value condition from the first exposure value condition, changing an exposure attribute of the image sensor from the first exposure value condition to the second exposure value condition, receiving the image signals of the first size and the second size, and correcting a property of the image signal of the second size based on the image signal of the first size, wherein the applied image processing module further includes a brightness correcting unit, and wherein the brightness correcting unit computes quantitatively a difference in brightness between the image of the first size and the image of the second size, selects adaptively a brightness correcting intensity, and corrects brightness of the image of the second size by the selected intensity; and the brightness correcting unit scales a size of the image of the second size to a size of the image of the first size to generate a downscaled image, calculates a difference in average values of histograms between the downscaled image and the image of the first size, selects adaptively a brightness correcting intensity, and corrects brightness of the image of the second size by the selected intensity.

2. The apparatus for digital image stabilization according to claim 1,
wherein the first exposure value condition is an exposure value condition of an auto exposure mode, and
wherein the second exposure value condition is an exposure value condition corresponding to an illuminance lower than an illuminance of the auto exposure mode.

3. The apparatus for digital image stabilization according to claim 1, further comprising:
a sensor controller for changing an exposure value condition of the image sensor; and
an exposure value lookup table for selecting the second exposure value condition based on the first exposure value condition;
wherein the applied image processing module
determines the second exposure value condition corresponding to the first exposure value condition by referencing the exposure value lookup table, and
controls the sensor controller to change the exposure value condition of the image sensor to the second exposure value condition.

4. The apparatus for digital image stabilization according to claim 1,
wherein the image signal of the first size is a preview image signal obtained in an auto exposure mode.

5. The apparatus for digital image stabilization according to claim 4,
wherein the preview image signal is an image signal generated at the latest time before an operation of a shutter where an image is generated at a regular frame interval in a preview mode.

6. The apparatus for digital image stabilization according to claim 1,
wherein the image signal of the second size is a captured still image signal obtained in an image capture mode.

7. The apparatus for digital image stabilization according to claims 1,
wherein the first and second exposure value conditions are defined by parameters including a shutter speed 'f' and ISO gain 'l' where ISO stands for International Standards Organization.

8. The apparatus for digital image stabilization according to claim 1,
wherein the image signal processing module encodes only the image signal of the second size, and
wherein the applied image processing module decodes the image signal of the second size before correcting the property of the image signal of the second size.

9. The apparatus for digital image stabilization according to claim 1,
wherein the applied image processing module includes a color correcting unit, and
wherein the color correcting unit corrects the color of the image of second size by
replacing pixel data of the image of the second size with pixel data of the image of the first size image, or
interpolating pixel data of the image of the second size based on the pixel data of the image of the first size in consideration of a size ratio between the image of the second size and the image of the first size.

10. The apparatus for digital image stabilization according to claim 9,
wherein the color correcting unit:
scales a size of the image of the second size to a size of the image of the first size to generate a downscaled image;
calculates a movement vector of the downscaled image using the image of the first size as a reference image; and
replaces pixel data of the image of the second size with pixel data of the image of the first size or interpolates pixel data of the image of the second size based on the pixel data of the image of the first size in consideration of the movement vector and a scaling factor of the downscaled image.

11. The apparatus for digital image stabilization according to claim 1, wherein the brightness correcting unit selects adaptively a brightness correcting intensity based on a difference between parameters that define the exposure value conditions used to generate the image of the first size and the image of the second size, and corrects brightness of the image of the second size by the selected intensity.

12. A method for digital image stabilization, comprising:
(a) obtaining a digital image of a first size under a first exposure value condition from an image sensor;
(b) determining adaptively a second exposure value condition based on the first exposure value condition where the second exposure value condition is smaller than the first exposure value condition;
(c) obtaining a digital image of a second size under the second exposure value condition from the image sensor where the second size is larger than the first size; and
(d) correcting a property of an image signal of the second size based on an image signal of the first size, wherein computing quantitatively a difference in brightness between the image of the first size and the image of the second size; determining adaptively a brightness correcting intensity of the image of the second size based on the difference in brightness; and correcting brightness of the image of the second size by the determined brightness correcting intensity; wherein scaling a size of the image of the second size to the first size to generate a downscaled image; and calculating histograms of the downscaled image and the image of the first size, and computing quantitatively a difference in brightness between the image of the first size and the image of the second size using a difference in average values of the histograms therebetween; determining adaptively a brightness correcting intensity of the image of the second size by the difference in brightness; and correcting brightness of the image of the second size by the determined brightness correcting intensity.

13. The method for digital image stabilization according to claim 12,
wherein, in the step (b), the second exposure value condition is fetched from an exposure value lookup table using the corresponding first exposure value condition.

14. The method for digital image stabilization according to claim 12,
wherein, in the step (a), the first exposure value condition is an exposure value condition of an auto exposure mode, and
wherein the digital image of the first size is an image generated at the latest time before operation of a shutter where an image is generated at a regular frame interval in a preview mode.

15. The method for digital image stabilization according to claim 12,
wherein, in the step (c), the second exposure value condition is an exposure value condition of a low exposure mode having a shorter exposure time than an auto exposure mode, and
wherein the digital image of the second size is a captured still image obtained at the time of operation of a shutter.

16. The method for digital image stabilization according to claim 12,
wherein, in the step (d), color is a property of the image of the second size that is corrected by
replacing pixel data of the image of the second size with pixel data of the image of the first size, or
interpolating pixel data of the image of the second size based on the pixel data of the image of the first size in consideration of a size ratio between the image of the second size and the image of the first size.

17. The method for digital image stabilization according to claim 16,
wherein the step (d) includes:
scaling a size of the image of the second size to the first size to generate a downscaled image;
calculating a movement vector of the downscaled image using the image of the first size as a reference image; and
replacing pixel data of the image of the second size with pixel data of the image of the first size, or interpolating pixel data of the image of the second size based on the pixel data of the image of the first size in consideration of the calculated movement vector and a scaling vector used to generate the downscaled image.

18. The method for digital image stabilization according to claim 12, wherein the step (d) includes:
computing a difference in brightness between the image of the first size and the image of the second size based on a difference between parameters that define the exposure value conditions used to generate the two images; determining adaptively a brightness correcting intensity of the image of the second size by the computed difference in brightness; and correcting brightness of the image of the second size by the determined brightness correcting intensity.

19. The method for digital image stabilization according to claim 12,
wherein the first and second exposure value conditions are defined by parameters including a shutter speed 'f' and ISO gain 'I'.

20. A computer readable medium stored thereon computer executable instructions for performing the method defined in claim 12.

* * * * *